(No Model.)

G. GIBSON.
NUT LOCK.

No. 492,722. Patented Feb. 28, 1893.

Witnesses

Inventor
Gerolt Gibson,
per
his Attorney

UNITED STATES PATENT OFFICE.

GEROLT GIBSON, OF ST. LOUIS, MISSOURI.

NUT-LOCK.

SPECIFICATION forming part of Letters Patent No. 492,722, dated February 28, 1893.

Application filed October 14, 1892. Serial No. 448,883. (No model.)

*To all whom it may concern:*

Be it known that I, GEROLT GIBSON, a citizen of the United States, residing at St. Louis, in the State of Missouri, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of appliances termed nut locks for locking nuts upon their bolts, especially for use in constructing railroads, bridges and other structures, in mills, electric or cable cars, agricultural implements, &c., and it has for its object to prevent the accidental displacement or unscrewing of the nut from the bolt under a jarring action or from other incidental cause, and to promote simplicity of construction and reduce to a minimum wear and tear upon the lock, and to these ends my invention consists of the novel construction and combination of parts substantially as hereinafter more fully disclosed and pointed out in the claims.

Figure 1:
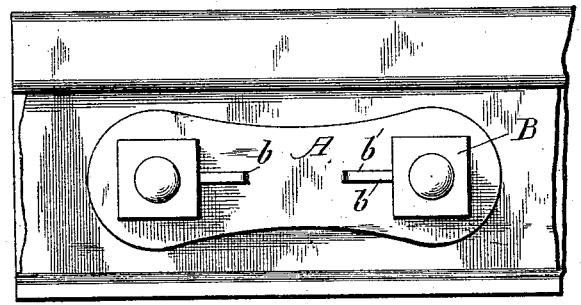
Figure 2:
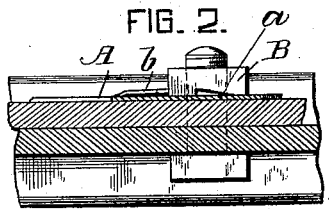

In the accompanying drawings: Figure 1 is a side view of my improved nut lock. Fig. 2 is a longitudinal section thereof. Figs. 3, 4, 5, 6, 7 and 8 are various modifications thereof, which will be described in detail farther on.

In the embodiment of my invention, I produce a washer or plate, A, out of sheet or cast metal, as preferred, and in it make two or more openings, $a$ $a$, to provide for its application to two or more bolts, as, for instance, the securing bolts of fish plates connecting the rail sections of a railroad track, or to bolts used for any other purpose or in any other place. This arrangement is not for the purpose of coupling the bolts, which is done by the fish plate, but to prevent the independent movement of the washer plate for a purpose which will be apparent hereinafter. It also does away with the production of a longitudinal slot in the bolt, thus economizing expense, and a tongue or projection upon the washer, at the margin of its opening or openings, engaging said slot; and the providing of the plate or washer with tapering projections or points which are driven or embedded in the surface where the bolts are passed through wood, among other ways heretofore adopted for preventing the independent turning of the washer or plate. I also provide the washer or plate, A, with spring detents or pawls, $b$, in this instance produced from, and integral with, the plate, leaving slots, $b'$, in the latter, and having their free ends extending inward to a point within reach of the notches of the ratchet-faces of the nuts, as shown. The spring detents or pawls, $b$, curve or incline upward toward their free ends to enable them to engage the inner ratchet or toothed faces of the nuts, B, for the locking of the latter upon their bolts against accidental displacement or unscrewing therefrom under a jarring action or from other causes, as experienced in railroads, and railroad, or other, bridges, in mills, cable cars, agricultural implements &c.

Instead of having the spring detents or pawls integral, or in one piece with the washer or plate as above described, they may be separate therefrom, as where the plate or washer is of cast metal, in which instance they are brazed or riveted to the plate or washer or otherwise attached thereto in whatever manner is most convenient, in that the plate or washer may be made of any shape, size or thickness. It will, therefore, be seen that, in the act or operation of screwing the nuts upon the bolts, the free ends of the detents or pawls will successively engage the notches of the ratchet faces of the nuts until the nuts are screwed home, the detents then springing into the notches of the nuts stopped opposite thereto, thus effecting the locking of the nuts upon their bolts, the accidental reversal of the nuts accordingly being prevented.

In order to unlock the nuts, it is only necessary to press sufficiently inward upon the spring detents to release them from engagement with the ratchet faces of the nuts, when the latter may be readily unscrewed and removed from their bolts.

Figure 3:
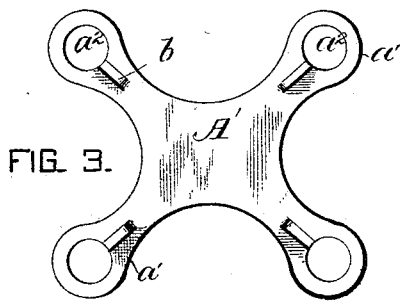

In the modification, as disclosed in Fig. 3, I have shown the washer as composed of a plate, A', having four radial arms, $a'$ $a'$, each with a bolt opening, $a^2$, therein and having a similar detent as Fig. 1 to adapt it for use with four bolts.

Figure 4:
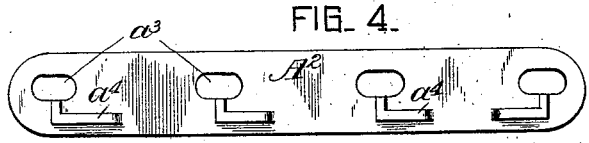
Figure 5:
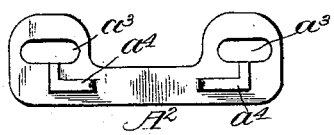
Figure 6:
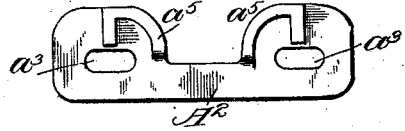
Figure 7:
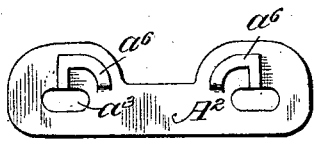

In the modifications as disclosed in Figs. 4, 5, 6 and 7, the washer is shown as adapted more particularly for railroads being provided with elongated bolt opening, $a^3$, to permit the expansion and contraction of the rail-sections, Fig. 4, however, having four openings for four bolts, and Figs. 5, 6 and 7 each having two openings for two bolts. In these instances each washer consists of a plate, $A^2$, the plates or washers in Figs. 4 and 5 having right angled spring detents or pawls, $a^4$, bodily punched or struck up out of the plate, with the free ends of their lateral arms terminating at the margins of the bolt openings in the plates or washers.

The plates or washers in Figs. 6 and 7 have each two spring detents or pawls, $a^5$ $a^6$, respectively, having the same general contour or outline, being curved from their points of connection with the plates outward, the free ends of the lateral arms of the detents or pawls, $a^5$, each terminating a short distance from each bolt-opening and the lateral arms of the detents or pawls, $a^6$, terminating just at the margins of the bolt-openings, as in Figs. 3, 4 and 5. The spring detents, $a^5$ and $a^6$, are bodily punched or struck up from their respective plates, the detents, $a^5$, at the margin of their plate, and the detents, $a^6 a^6$, interiorly of their plate, as shown.

Figure 8:
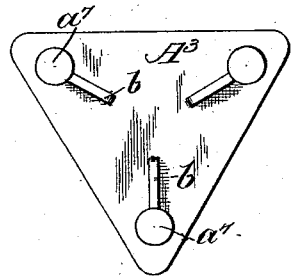

In the modification, as disclosed in Fig. 8, the washer is shown as adapted for three bolts, the same consisting of a plate, $A^3$, having that number of bolt-openings, $a^7$, and having the same character of spring detents, $b$, as shown in Figs. 1 and 2.

I make no specific claim herein to the spring having the radial pawl or detent, the same being specifically claimed in my concurrent application filed September 29, 1892, Serial No. 447,315.

I claim—

1. In a nut lock, the combination with a nut whose base is provided with a series of notches or ratchets of a locking plate or washer having a spring detent or stop, the point of connection of said stop or detent with its spring, and the spring itself, being outside of the base of the nut, substantially as and for the purpose set forth.

2. In a nut lock, the combination, with a series of nuts whose bases are provided with notches or ratchets, of a washer having a series or plurality of bolt-openings and a series of spring-detents or pawls, the points of connection of said detents or pawls with their springs and the springs themselves, being outside of the bases of the nuts, substantially as and for the purpose set forth.

3. In a nut-lock, the combination, with a series of nuts whose bases are provided with notches or ratchets, of a washer having a series or plurality of bolt openings and a series of detents or pawls, each consisting of a spring arm, the arm proper being at right angles to the spring, and the points of connection of the arms with the springs, and the springs themselves, being outside of the bases of the nuts, substantially as set forth.

4. In a nut-lock, the combination, with a plurality of nuts whose bases are provided with notches or ratchets, of a washer having a plurality of bolt-openings and a plurality of pawls or detents, each consisting of a spring-arm, the arm proper, being at right angles to the spring, and relatively conformed to said bolt-opening and adapted to engage the notches or ratchets of said nuts, the points of connection of said arms with their springs and the springs themselves, being outside of the bases of the nuts, substantially as specified.

5. In a nut-lock, the combination, with a plurality of nuts whose bases are provided with notches or ratchets, of a washer having a series of differently relatively arranged bolt-openings and a series of spring-pawls or detents relatively conformed to said bolt-openings and adapted to engage the notches or ratchets of said nuts, the points of connection of the detents or pawls with their springs and the springs themselves, being outside of the bases of the nuts, substantially as specified.

In testimony whereof I affix my signature in presence of two witnesses.

GEROLT GIBSON.

Witnesses:
HENRY W. BOND,
P. S. DROWN.